United States Patent
Swain et al.

(10) Patent No.: US 8,480,401 B2
(45) Date of Patent: Jul. 9, 2013

(54) MULTI-USER HEADSET TEACHING APPARATUS

(75) Inventors: Steven Swain, Circle Pines, MN (US); Jeffrey Waffensmith, Robbinsdale, MN (US)

(73) Assignee: Harebrain, Inc., Minneapolis, MN (US)

( * ) Notice: Subject to any disclaimer, the term of this patent is extended or adjusted under 35 U.S.C. 154(b) by 5 days.

(21) Appl. No.: 13/201,080

(22) PCT Filed: Mar. 2, 2010

(86) PCT No.: PCT/US2010/025882
§ 371 (c)(1),
(2), (4) Date: Sep. 14, 2011

(87) PCT Pub. No.: WO2010/101890
PCT Pub. Date: Sep. 10, 2010

(65) Prior Publication Data
US 2011/0318719 A1    Dec. 29, 2011

Related U.S. Application Data

(60) Provisional application No. 61/156,627, filed on Mar. 2, 2009.

(51) Int. Cl.
*G09B 19/04*    (2006.01)

(52) U.S. Cl.
USPC .......................................................... 434/185

(58) Field of Classification Search
USPC .......................................................... 434/185
See application file for complete search history.

(56) References Cited

U.S. PATENT DOCUMENTS

| | | | |
|---|---|---|---|
| 3,845,838 A | | 11/1974 | Malmrose et al. |
| 6,035,885 A | * | 3/2000 | Schuessler et al. ...... 137/315.27 |
| 7,058,384 B2 | | 6/2006 | Davies |
| 2009/0074196 A1 | * | 3/2009 | Tiodor et al. .................... 381/58 |

FOREIGN PATENT DOCUMENTS

KR    10-0474410 B1    3/2005

* cited by examiner

*Primary Examiner* — Xuan Thai
*Assistant Examiner* — Jerry-Daryl Fletcher
(74) *Attorney, Agent, or Firm* — Leffert Jay & Polglaze, P.A.

(57) ABSTRACT

Acoustical voice-feedback systems include headsets connected through a connector or central hub for vocalizing and sound formation assistance. A user's voice is conveyed directly into his or her own ear as well as the ears of each connected user. A central hub allows selective connection of one or more headsets to each other, or allows an instructor to selectively connect an instructor headset to one or more instructee headsets.

15 Claims, 7 Drawing Sheets

MULTI-USER HEADSET TEACHING APPARATUS

FIELD

The present disclosure relates generally to vocalizing assist devices and in particular the present disclosure relates to multiple-user vocalizing assist devices.

BACKGROUND

Audio vocalizing assist devices exist for use by a single user. However, while such devices may be effective in self-learning, in the cases normal learners, as well as learners with learning difficulties such as learning disabilities, articulation, auditory discrimination, dyslexia, central auditory processing disorders (CAPD), ADD and ADHD, reading fluency, prosodic defects, autism, and the like, individual usage of a vocalizing assist device may not be efficient or even sufficient to address issues.

In a one-on-one situation, a speech or auditory specialist may rely on a quiet setting or location for teaching. However, in certain situations, such as a group environment, the necessary noise level for effective teaching can be quite low. With external noises, learning of a precise nature, such as vocalization, can be very difficult.

For the reasons stated above, and for other reasons stated below which will become apparent to those skilled in the art upon reading and understanding the present specification, there is a need in the art for multiple user audio vocalizing assist devices.

DETAILED DESCRIPTION

Figure 1:
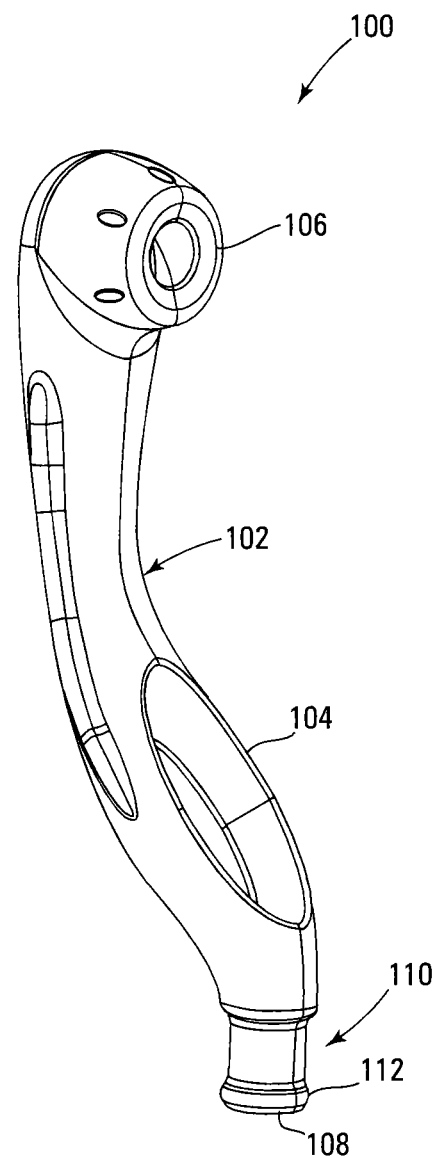
FIG. 1 is a perspective view of a headset used in one embodiment of the present invention.

In the following detailed description of the embodiments, reference is made to the accompanying drawings that form a part hereof. In the drawings, like numerals describe substantially similar components throughout the several views. These embodiments are described in sufficient detail to enable those skilled in the art to practice the invention. Other embodiments may be utilized and structural or logical changes may be made without departing from the scope of the present invention.

The following detailed description is, therefore, not to be taken in a limiting sense, and the scope of the present disclosure is defined only by the appended claims, along with the full scope of equivalents to which such claims are entitled.

The embodiments of the present invention provide acoustical voice-feedback headsets connected for multiple users that enable learners of all ages to focus and hear the sounds that make up words (phonemes) more clearly as they learn to read, spell, or process language aloud. When a student (instructee) or teacher (instructor) using the connected system speaks, the sound of his or her voice is conveyed directly into his or her own ear as well as the ears of each connected user, so they can hear the voice more clearly. This creates an improved signal-to-noise ratio, which means the user can hear the voice better over all background noise. This improved signal-to-noise ratio provides a clarified signal of intelligible speech thereby raising phonemic awareness and optimizing the process of learning to read or process language, especially since a student can also see the lip and/or mouth motions made by another connected user and instantly have the sound conveyed clearly and accurately to the user's ear.

The embodiments of the present invention when used in a teaching environment, with an instructor/teacher/speech therapist using one headset and one or more students using additional connected headsets, can assist teaching students who struggle with, for example only and not by way of limitation, articulation, auditory discrimination, dyslexia, CAPD, reading fluency, prosodic defects, self-monitoring/correcting, and autism.

The embodiments of the present invention provide listening assist devices for multiple users. The devices themselves are acoustic assist headsets that direct sounds to the ear of a listener when the listener speaks. Also, the connection of multiple headsets with a common connector allows for the hearing of the same sounds by multiple users at the same time. This provides an ability to accomplish group teaching where previously individual teaching was the most effective course of action.

Figure 2:
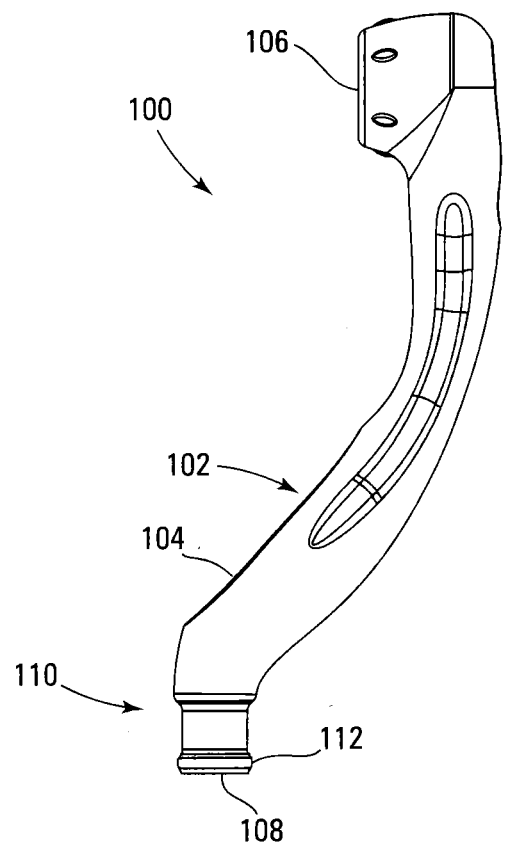
FIG. 2 is a side elevation view of the headset of FIG. 1.

Referring to FIGS. 1 and 2, a headset 100 according to one embodiment is shown in perspective. The headset 100 comprises a main body 102 connecting a speaking opening 104 and a listening opening 106. A port 108 at port end 110 of the headset 100 allows connection of the headset 100 to an external connector (described below). The port 108 has a lip 112 to assist in connection of the headset 100 to another component such as a connector or the like (described in further detail below).

When a user speaks, or whispers, into the speaking opening, the sound is directed to the listening opening 106 and out the port 108. The speaker can hear his or her own voice. The headset is used to teach what sounds are associated with what speech, lip, and/or tongue movements the user makes, as well as what sounds are associated with the printed material. This is often referred to as the print to sound match. When a speaker can hear his or her own voice and associate it with the vocalization and/or speech actions that are being used, it can help the user become better at speech.

Figure 3:
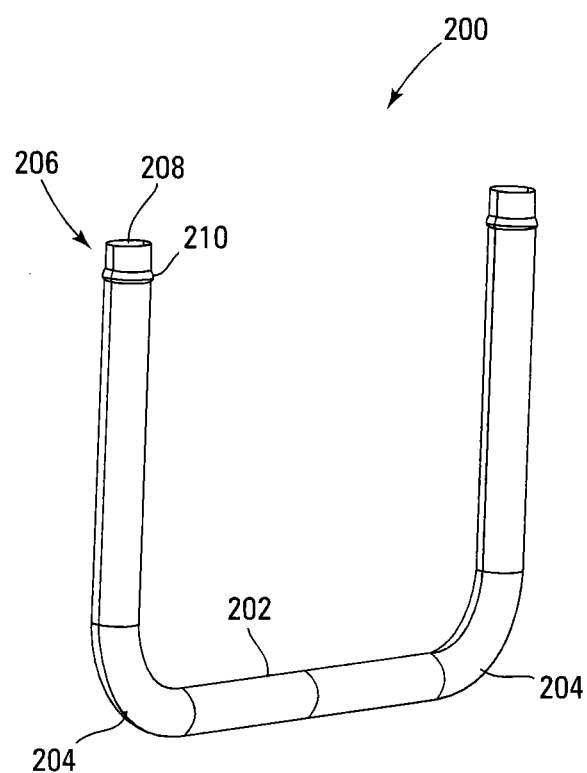
FIG. 3 is a perspective view of a connector tube used in one embodiment of the present invention.

A headset such as headset 100 is connectable in one embodiment to another headset using a connector 200 as is shown in FIG. 3. The connector 200 comprises in one embodiment a connector body 202 which may be substantially rigid and have one or more bends 204, or in another embodiment may be a flexible tube made of plastic or the like. The connector 200 has headset connecting ends 206, each having a connector opening 208. The connector is connectable with a headset such as headset 100 at each connector end 206. In one embodiment, a connector lip 210 matches headset lip 112, so that the port end 110 of the headset 100 can be slid into connector opening 208 and the headset lip 112 and the connector lip 210 match to hold connector 200 and headset 100 together during use of the system.

Figure 4:
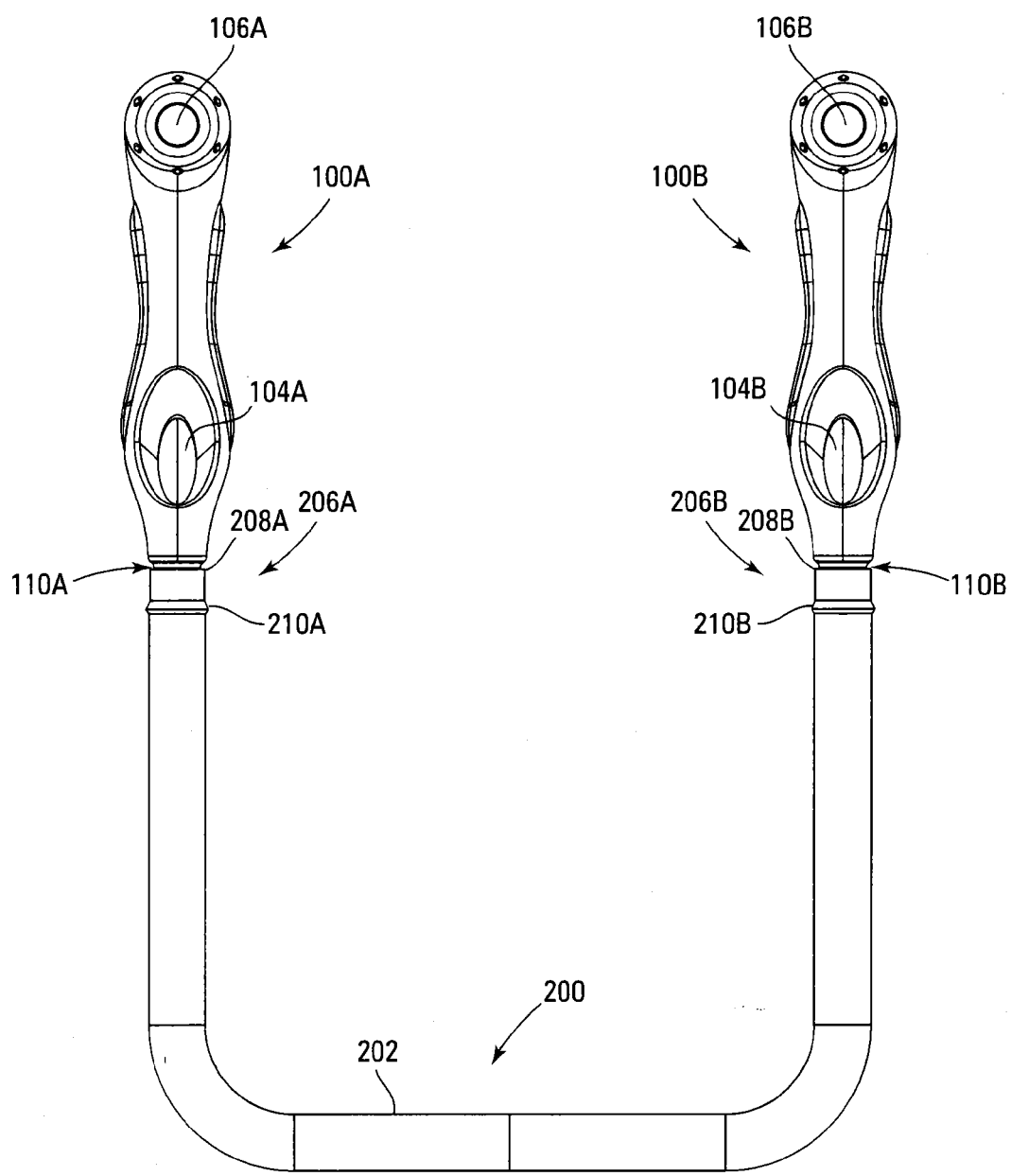
FIG. 4 is a front elevation view of a system according to another embodiment of the present invention.

Referring to FIG. 4, a connector 200 with two headsets 100A and 100B connected to ends 206A and 206B of the connector 200 are shown. When headsets 100A and 100B are connected at their respective ends 206A and 206B of the connector 200, the user of connected headset 100A can hear not only himself or herself in the ear opening 106A but also hear the voice of the other connected user which is transmitted from headset 100B through the connector 200, into the headset 100A and through to the ear opening 106A.

In operation, the system comprising two headsets such as headsets 100 connected with a connector such as connector 200 is used so that users of each headset can see motions of the mouths of others and simultaneously hear the sounds that occur given the mouth/lip motions.

There are a number of potential ways to use a pair of headsets connected to each other with a connector. For example, two students can use the connected headsets to practice speaking or reading, or a teacher can speak a proper word for a student to hear, or listen to a student's speech to allow the teacher to make corrections to the speech of the student.

Figure 5:
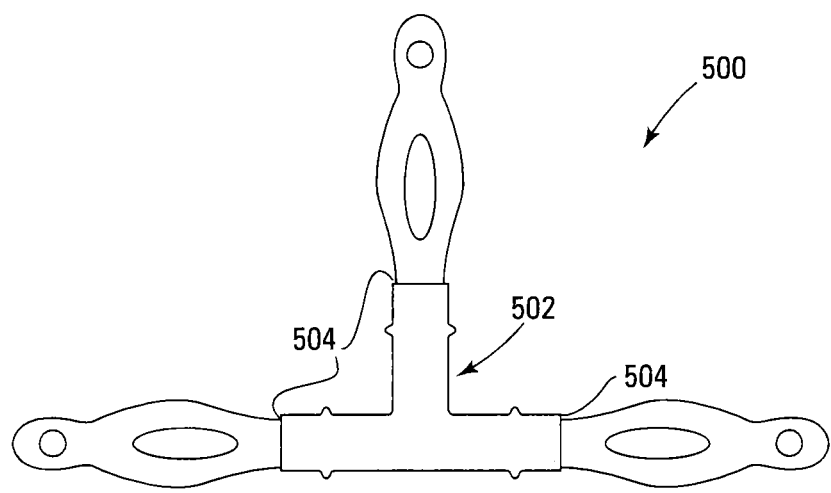
FIG. 5 is a view of a system according to another embodiment of the present invention.

In another embodiment 500 shown in FIG. 5, a T-connector 502 comprises a T-shaped component that accepts a port 108 of a headset into each of its openings 504. Alternatively, the T-connector 502 can connect to an existing connector such as connector 200 to form a chain of multiple connected headsets. This further allows the connection of additional headsets with additional connector pieces. Further, the T-connector 502 need not only have two additional connectors. In another embodiment, it can have more than two additional ports for connection of additional headsets with additional connector pieces. In such an embodiment, when fewer than the total number of additional connector ports are used, a terminating plug or port cover (not shown) can be used to prevent escape of sound from the unconnected port.

Figure 6:
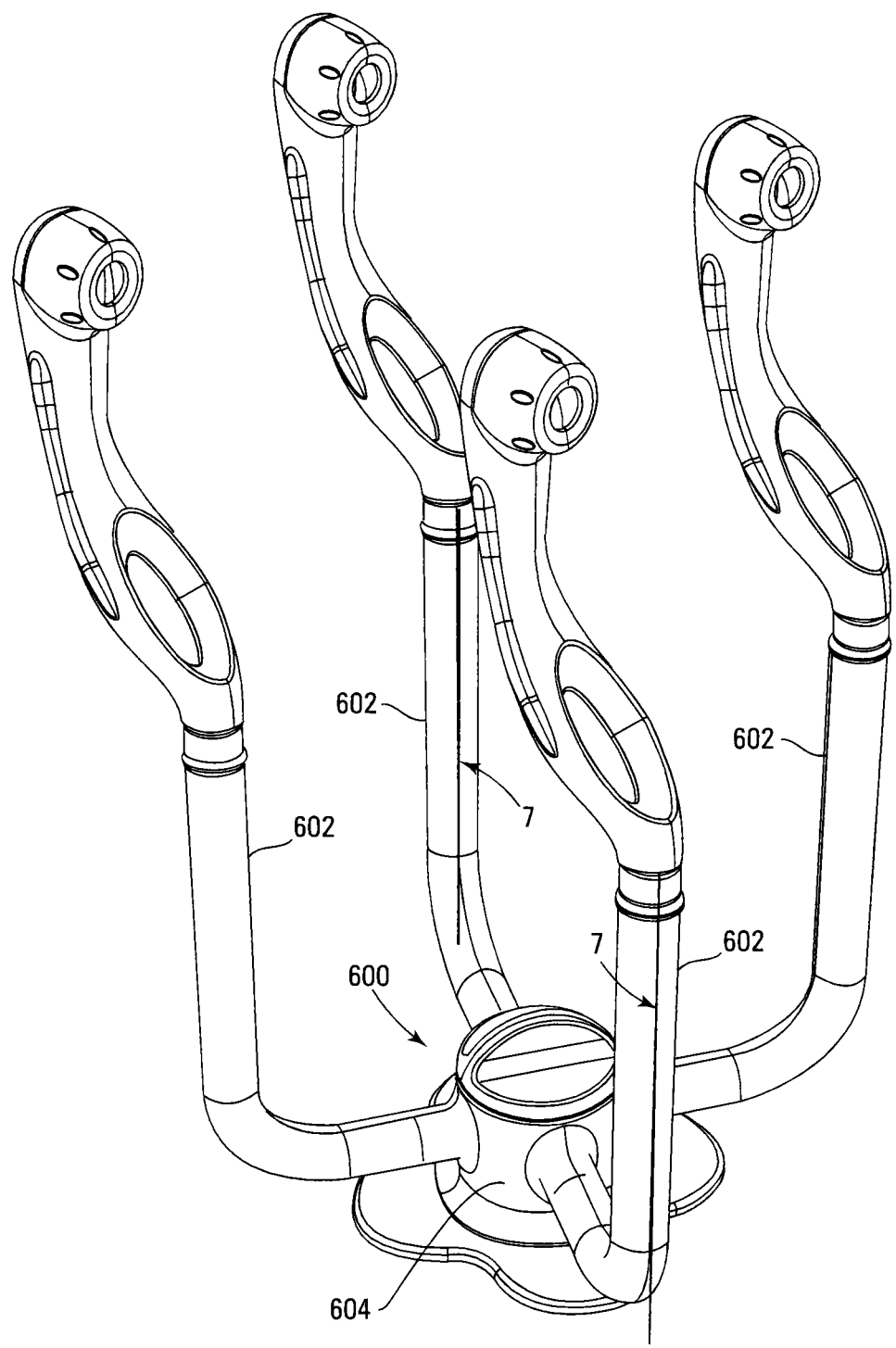
FIG. 6 is a perspective view of yet another embodiment of the present invention.
Figure 7:
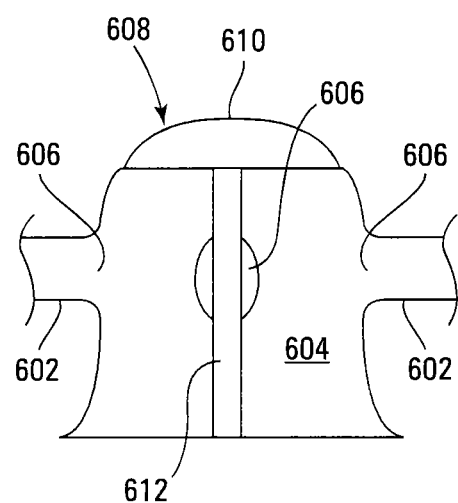
FIG. 7 is a section view of a portion of the embodiment of FIG. 6, taken along lines 7-7 thereof.

In another embodiment, multiple headsets such as headset 100 are connected to a distribution hub such hub 600 shown in FIG. 6. Hub 600 acts as a distribution center for multiple headsets 100 connected via connector tubes 602. Hub 600 comprises a center body 604 that has a plurality of connector tubes 602 attached, either permanently or removably, thereto. Referring also to FIG. 7, which is a cutaway section view of hub 600, hub 600 has an interior chamber 604 that is generally open to each of connector tube 602 openings 606. A selector valve 608 has a valve handle 608 and valve body 612. Configuration of the valve body 612 is such that the valve body can cut off access to one or more openings 606 selectively, to allow multiple users to use the hub collectively when all openings 606 are unobstructed, or to allow individual, that is one-to-one, communication and teaching between two connected headsets, such as one headset of a teacher and another of a student.

It should be understood that the valve 608 can be configured by one of skill in the art to obstruct one or more openings 606 in many different ways without departing from the scope of the disclosure, and that numerous ways to configure such a valve are within the scope of the disclosure as well. For example, a teacher/instructor connection port may be placed at a top of the hub so that the teacher/instructor can close all but one opening 606 at a time, and provide serial individual instruction to a number of students without requiring disconnection of a headset from one dedicated connector (such as connector 200) to communicate with/teach other students. Simply rotating the valve 608 makes the appropriate opening 606 available.

It should further be understood that while a twist valve has been described herein. other valve designs may also be used. For example, a push-button on-off valve may be used without departing from the scope of the invention. Other such valves will be apparent to those skilled in the art, and are also within the scope of the invention.

It should be understood that while a connector hub 600 with four connector tubes 602 is shown, more or fewer connector tubes may be used without departing from the scope of the disclosure.

In operation, the hub 600 works as follows. A teacher or instructor has one headset connected to the hub 600, with the remainder of the hub connector tubes 602 connected to headsets used by students. The valve 608 is operated so as to allow the instructor to listen to and speak with all or a selected one or more of the students at the same time. For individual instruction, all headsets not used by the student to be instructed are closed off from the interior chamber 604 by the valve. For group instruction, all the headsets connected via the connector tubes 602 are open to the interior chamber 604.

In one embodiment, a multiple unit audio vocalizing assist system includes at least two headsets, and a connector connected between the at least two headsets, to transmit sound therethrough between the headsets. Each headset has a body, a listening opening in the body, a speaking opening in the body, and a port at one end of the body, the port having an opening through which sound is passed to and from the connector.

Additional multiple-user vocalizing assist devices include a central hub with connector tubes, the central hub having a valve for selectively allowing use of one or more headsets connected to the connecting tubes.

It should be noted that the acoustic and direct connection in the headsets, connectors, and hubs of the various embodiments is not an electrical or otherwise amplified sound. The acoustic properties of the headsets, connectors, and hubs have sound waves passing through the headsets, connectors, and hubs are unaltered in the sense that they are not amplified by any electrical function.

CONCLUSION

Vocalizing assist devices and methods of using vocalizing assist devices have been described that include multiple-user devices having multiple headsets and connectors therebetween so that each user can listen to his or her own voice and the voice of one or more others for the purposes of learning.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

What is claimed is:

1. A multiple unit audio vocalizing assist system, comprising:
   at least two acoustic headsets each having a body, a listening opening in the body, a speaking opening in the body, a port at one end of the body; and
   an acoustic connector connected between the at least two acoustic headsets to transmit sound directly therethrough between the acoustic headsets, wherein the port has an opening through which sound is passed to and from the acoustic connector and from the speaking opening to the listening opening.

2. The system of claim 1, wherein the acoustic connector further comprises:
   a central hub with connector tubes, the central hub having a valve for selectively allowing use of one or more acoustic headsets connected to the connecting tubes.

3. The system of claim 2, wherein the central hub further comprises:
   an interior chamber selectively openable to each of the connector tubes; and
   a selector valve to selectively connect two of the acoustic headsets or to connect all of the acoustic headsets through the interior chamber.

4. The system of claim 3, wherein the selector valve further comprises a valve handle and a valve body, the handle operable to control the valve to cut off acoustic access to one or more of the connector tubes.

5. The system of claim 2, wherein the central hub further comprises:
   an instructor connector opening open to an interior chamber of the central hub; and
   a plurality of instructee connector openings selectively connectable to the interior chamber.

6. The system of claim 1, wherein the connector further comprises:
   a T-shaped body having a plurality of openings therein and connectable to a port of an acoustic headset into each of the plurality of openings.

7. An audio vocalizing assist system, comprising:
   an acoustic central hub unit; and
   a plurality of acoustic headsets, each acoustic headset connected to the acoustic central hub unit with a connector, the acoustic central hub unit having a valve for selectably connecting at least two of the plurality of acoustic headsets directly and acoustically to one another.

8. The system of claim 7, wherein each connector is a flexible tube.

9. The system of claim 7, wherein each acoustic headset has a body, a listening opening in the body, a speaking opening in the body, a port at one end of the body, the port having an opening through which sound is passed to and from the connector and from the speaking opening to the listening opening.

10. The system of claim 9, wherein the acoustic central hub further comprises:
    an instructor connector opening open to an interior chamber of the acoustic central hub; and
    a plurality of instructee connector openings selectively connectable to the interior chamber.

11. The system of claim 7, wherein the acoustic central hub further comprises:
    an interior chamber selectively openable to each of the connector tubes; and
    a selector valve to selectively connect two of the headsets or to connect all of the acoustic headsets through the interior chamber.

12. The system of claim 11, wherein the valve further comprises a valve handle and a valve body, the handle operable to control the valve to cut off acoustic access to one or more of the connector tubes.

13. A method of acoustical voice feedback instruction, comprising:
    providing a plurality of acoustic headsets for a plurality of users, the headsets each having a body, a listening opening in the body, a speaking opening in the body, and a port at one end of the body;
    connecting the plurality of acoustic headsets with a connector;
    selectively connecting two of the plurality of acoustic headsets for individual instruction between the connected two of the plurality of acoustic headsets; and
    connecting all of the plurality of acoustic headsets for group instruction.

14. The method of claim 13, wherein selectively connecting two of the plurality of acoustic headsets further comprises operating a valve in a connector to selectively connect the two of the plurality of acoustic headsets.

15. The method of claim 13, wherein connecting all of the plurality of acoustic headsets further comprises opening a valve to connect all of the plurality of acoustic headsets.

* * * * *